Figure 1:
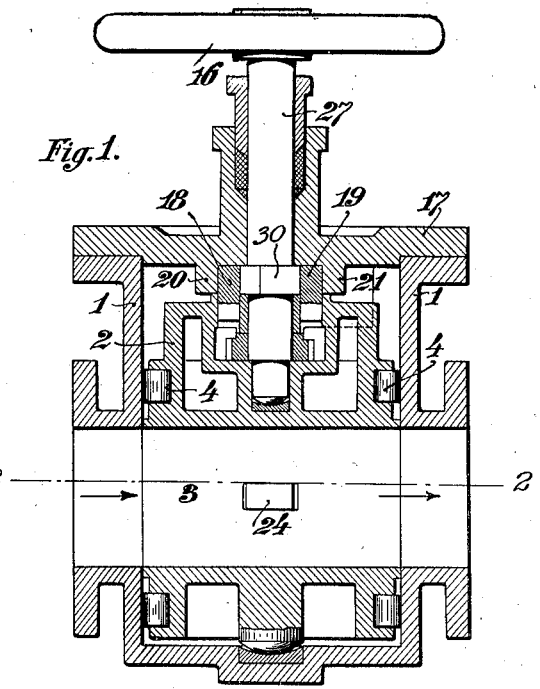

Feb. 16, 1926.                                                1,572,985
                          A. BÖTTNER
              STEAM CUT-OFF VALVE OR STOP VALVE
                        Filed May 5, 1925           3 Sheets-Sheet 1

Inventor:
Arno Böttner
By
   Attorney

Feb. 16, 1926.

A. BÖTTNER 1,572,985

STEAM CUT-OFF VALVE OR STOP VALVE

Filed May 5, 1925   3 Sheets-Sheet 2

Inventor:
Arno Böttner
By
Attorney

Feb. 16, 1926. 1,572,985
A. BÖTTNER
STEAM CUT-OFF VALVE OR STOP VALVE
Filed May 5, 1925 3 Sheets-Sheet 3

Inventor:
Arno Böttner
By *[signature]*
Attorney.

Patented Feb. 16, 1926.

1,572,985

UNITED STATES PATENT OFFICE.

ARNO BÖTTNER, OF SUDENBURG, NEAR MAGDEBURG, GERMANY, ASSIGNOR TO THE FIRM POLTE, OF MAGDEBURG, GERMANY.

STEAM-CUT-OFF VALVE OR STOP VALVE.

Application filed May 5, 1925. Serial No. 28,122.

*To all whom it may concern:*

Be it known that I, ARNO BÖTTNER, engineer, a citizen of the German Republic, residing at Sudenburg, near Magdeburg, Helmstedterstrasse 58, Germany, have invented certain new and useful Improvements in Steam-Cut-Off Valves or Stop Valves, of which the following is a specification.

My invention relates to an improved steam-cut-off or stop valve of the type including a preferably cylindrical valve body with a transverse bore for the steam to pass therethrough and adapted to be turned about an axis situated vertically with respect to the axis of the steam conduit two cut-off plates forming a part of the said body and a spindle or stem adapted to be rotated, by means of a hand-wheel or the like, without moving lengthwise.

The object of my invention is to provide a stop-valve of the above stated kind which will be efficient and reliable in operation and highly practical from both the standpoint of the manufacturer and the standpoint of the user and which, it is believed, may be manufactured at a comparatively low cost and has important characteristics of its own such as the coupling means between the rotary valve body and the spindle or stem, said means being adapted to be thrown out automatically upon the rotation of the valve body into the shut-off position, so that the latter will come to a position of rest and the cut-off plates can be forced into their sealing position and vice versa.

The movements inherent to these operations are brought about preferably by means of two vertical shafts mounted in suitable bearings of the valve body and actuated by the spindle or stem through the agency of a toothed gearing, the two shafts being provided with cam-like members for the purpose and connected with auxiliary valves for facilitating the opening of the main valve and mounted in the two cut-off plates so as to be positively opened when the cut-off plates are withdrawn from their sealing seats, but free to move and to automatically close under the steam pressure existing in the conduit when the cut-off plates are in their sealing position.

Figure 2:
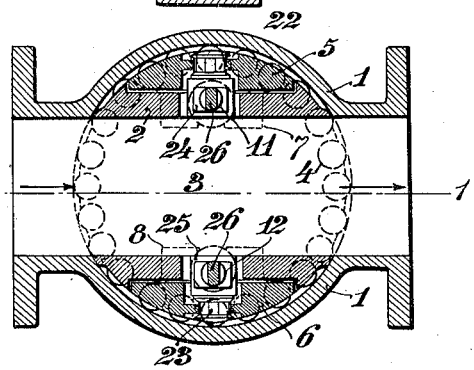
Figure 3:
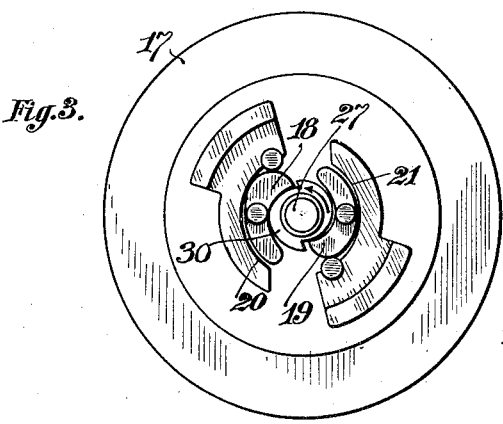
Figure 4:
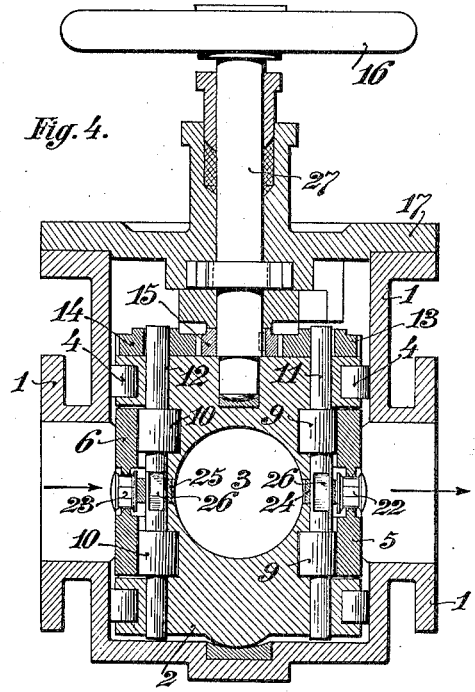
Figure 5:
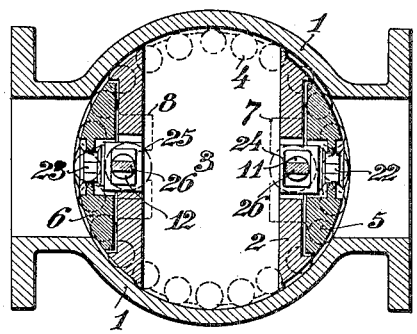
Figure 6:
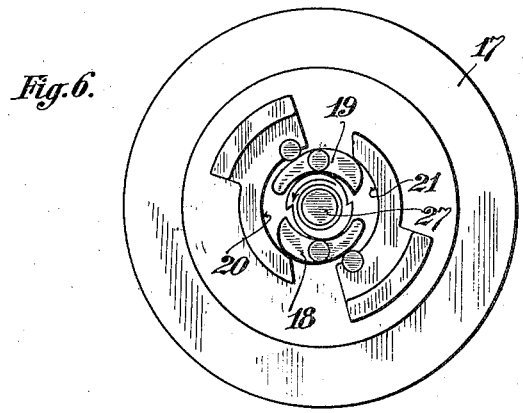
Figure 7:
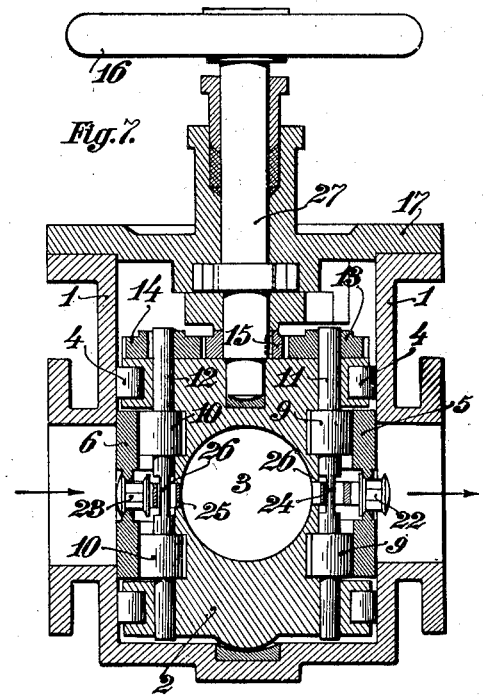
Figure 8:
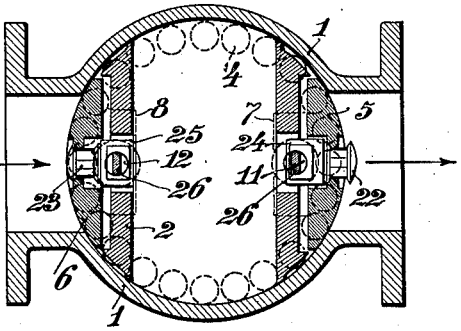
Figure 9:
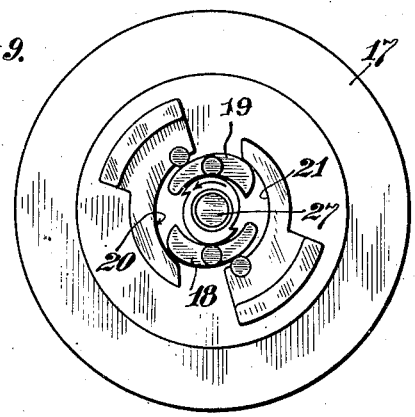

In the accompanying drawings forming a part of this specification and showing, for the purpose of exemplification a preferred form and manner in which the invention may be embodied and practised:

Figure 1 is a vertical section taken on the line 1—1 of Figure 2 which is a horizontal section on the line 2—2 of Figure 1; Figure 3 is a front view of the underside of the valve cover or bonnet; Figures 4, 5 and 6 are views of the valve similar to Figures 1, 2 and 3, respectively, illustrating a different position of the operating parts and Figures 7, 8 and 9 are views of the valves similar to Figures 1, 2 and 3, respectively, showing the cut-off plates and the auxiliary valves in a position differing from that depicted in Figures 4 to 6.

Parts which are repeated in the several figures bear the same reference characters in each case.

The cut-off valve as shown in the drawings comprises a casing 1 with a rotary valve body 2 of cylindrical form mounted therein so as to be free to be turned about an axis arranged vertically with respect to the axis of the steam conduit into which the valve is to be inserted. The body 2 is bored and the diameter of the bore 3 is the same as that of the two openings of the casing provided with annular flanges for the connection with the steam conduit, as usual in valves of that kind The outer diameter of the body 2 is a little less than the inner diameter of the cylindrical casing, but the difference or clearance is filled out and compensated by two rows or series of rollers 4, balls or the like mounted in suitable recesses of the body 2 near the top and near the bottom of the same, so as to freely rotate upon movement of the body and to hold the latter always in centered position.

Mounted in peripheral recesses of the body 2 are two cut-off plates 5 and 6 located diametrically opposite each other and parallel to the bore 3, that is displaced, with relation to the bore 3, by 90°. The plates 5 and 6 are shaped at their inner sides to form seats or eyes as at 7 and 8 for the reception of cams 9 and 10, respectively, rigidly connected or integral with vertical shafts 11 and 12, respectively, mounted in the valve body 2. It goes without saying that any equivalent means may be substituted for the stated cams 9 and 10, such as cranks or the like, formed on the shafts 11 and 12. The latter are duly supported in bearings and toothed wheels 13 and 14, respectively, or similar formations are keyed to the upper ends of the two shafts so as to engage with a gear 15 keyed to the valve spindle or stem 27 provided with a hand wheel 16 and mounted in the cover 17 in the usual manner, so as to be capable of rotary movement but incapable of axial displacement. The reduced lower end of the spindle 27 is supported in a step-bearing formed in the valve body 2.

The rotary movement of the spindle 27 is positively transmitted to the valve body 2 by two coupling pawls 18 and 19 pivotally connected with the latter and engaging with a kind of a ratchet wheel 30 firmly attached to the spindle 27. On the inner face of the cover 17 two projections or cams 20 and 21 are provided and these projections or cams 20 and 21 are shaped to co-operate with the pawls 18 and 19, respectively, to automatically disengage the same from the spindle 27 or the ratchet wheel thereof, properly speaking, as soon as the valve body 2 has been turned 90° in order to close the valve so that the cut-off plates and the other operating parts are in the position shown in Figures 4 to 6.

In each of the two cut-off plates 5 and 6 an auxiliary valve 22 and 23, respectively, is provided. These two valves 22 and 23 are double-acting valves adapted to close a passage in the plate 5 or 6, respectively, from either side, the stem of the valves being shaped to form a frame or eye 24 and 25, respectively, co-operating with a recessed portion 26 of the shafts 11 and 12. As will be seen in Figures 4 to 9 the arrangement is such that when the cut-off plates are in the complete sealing position shown in Figures 7 and 8, the valves 22 and 23 are closed by the pressure of the steam or other fluid acting in the direction of the arrows, whereas when the cut-off plates are withdrawn from contact with the inner wall face of the valve casing to the position shown in Figures 4 and 5, the valves 22 and 23 are positively opened so that the steam or other fluid will be free to pass through the valve and the casing of the valve will be relieved of pressure. The two extreme or end positions of the valve body 2 in the casing are limited by stationary stops or abutments and the body 2 is preferably supported by a ball-bearing or a thrust bearing as shown.

The operation of the valve is as follows:—

When the valve is open so that the bore 3 exactly coincides with the two openings of the casing as shown in Figures 1 and 2, the coupling pawls 18 and 19 engage the spindle 27 or, properly speaking, the ratchet wheel 30 thereof as will be seen in Figure 3. In order to close the valve, the hand-wheel 16 and thereby the spindle 27 is to be turned in clockwise direction in order to displace the valve body 2 for 90°, that is to say, from the position shown in Figures 1 and 2 to that illustrated in Figures 4 and 5, so that the cut-off plates 5 and 6 will be in front of the two openings of the casing 1. Simultaneously therewith the two coupling pawls 18 and 19 run over the controlling faces of the cams 20 and 21, respectively, which are shaped to displace the pawls from their engaging position shown in Figure 3 to the released position illustrated in Figure 6 so that on continued rotation of the hand-wheel 16 in clockwise direction the shafts 11 and 12 will be rotated through the toothed gearing 13, 14 and 15 and the cams 9 and 10 will be caused thereby to forcibly press the cut-off plates 5 and 6 towards and into intimate contact with the inner face of the casing 1.

The cams 9 and 10 are shaped and arranged to move the cut-off plates 5 and 6, upon a continued rotation of the hand-wheel 16 for say 90°, from the position shown in Figures 4 and 5 to that illustrated in Figures 7 and 8 so as to ensure a perfectly tight seal. The recessed, flat portions 26 of the two shafts 11 and 12 are located, at this position of the cut-off plates transversely within the frames or eyes 24 and 25, as will be readily understood on inspection of Figures 7 and 8, so that the two auxiliary valves 22 and 23 are free to automatically close under the pressure of the steam or fluid. By then turning the hand-wheel 16 in counter-clockwise direction the two valves 22 and 23 are mechanically opened, as hereinbefore described, and at the same time the cut-off plates 5 and 6 are withdrawn from the position shown in Figures 7 and 8 to that illustrated in Figures 4 and 5. The plates 5 and 6 are arranged in a manner to adopt, when thus withdrawn, a position in close proximity to the valve body 2 so that the latter, on continued rotation of the hand wheel 16 in counter-clockwise direction, will be caused to turn without the agency of the pawls 18 and 19 and to return to the position shown in Figures 1 and 2. When the parts have returned to the last mentioned position the coupling pawls 18 and 19 are again caused, by the controlling faces of the lugs 20 and 21, to automatically engage the ratchet wheel 30 of the spindle 27, that is to say, to return from the position illustrated in Figure 6 to that shown in Figure 3. Obviously the pawl and ratchet mechanism may be constructed and arranged to positively return the valve body 2 into the open position, if desired.

It will be seen that, owing to the clearances provided between adjacent faces, frictional contact is efficiently avoided between the sealing faces, no matter in which direction the valve body is turned, so that the parts are effectively safeguarded from wear.

While I have shown and described my invention embodied in a certain valve, it is not to be inferred that such valve represents the only form in which my invention may be embodied, but is illustrated and described only as illustrative of a form now preferred by me, and to make clear the principles and the method of my invention. I do not, of course, desire to be limited to the exact details of construction and arrangement shown and described as modifications are no doubt possible which would still come within the scope of the invention.

What I claim is:—

1. A stop valve of the type set forth comprising a casing, a rotary valve body fitted in said casing and having a transverse bore, two cut-off plates attached to the said valve body diametrically opposite each other and parallel to the bore thereof, a spindle adapted to be turned but not moved lengthwise, and coupling means connecting the said spindle with the said valve body and adapted to be automatically thrown out when the valve body has been turned into its closing position, substantially as and for the purpose set forth.

2. A stop valve of the character set forth comprising a casing, a rotary valve body fitted in said casing and having a transverse bore, two cut-off plates attached to the said valve body diametrically opposite each other and parallel to the bore thereof, a spindle adapted to be turned but not moved lengthwise, for moving the said valve body and controlling the said cut-off plates, two shafts mounted in the said valve body, cam-like formations on the said shafts, a toothed gearing for transmitting motion from the spindle to the said shafts, and coupling means connecting the said spindle with the said valve body, substantially as and for the purpose set forth.

3. A stop valve of the character set forth comprising a casing, a rotary valve body fitted in said casing and having a transverse bore, two cut-off plates attached to the said valve body diametrically opposite each other in parallelism to the bore thereof, a spindle adapted to be turned but not moved axially, for moving the said valve body and controlling the said cut-off plates, two shafts mounted in the said valve body, cam-like formations on the said shafts, auxiliary valves in the said cut-off plates and connected with the said shafts for controlling purposes, a toothed gearing for transmitting motion from the spindle to the said shafts, and coupling means connecting the said spindle with the said valve body, substantially as and for the purpose set forth.

4. A cut-off valve comprising a casing; a cylindrical rotary valve body in said casing and having a transverse bore for the passage of the fluid; a pair of diametrically opposite cut-off plates associated with said body; a spindle for rotating said valve body; and means on said valve body and said spindle for actuating said cut-off plates.

5. A cut-off valve comprising a casing; a cylindrical rotary valve body in said casing and having a transverse bore for the passage of the fluid; a pair of diametrically opposite cut-off plates associated with said valve body; a spindle for actuating said valve body; a cover for said casing and in and through which the spindle projects; and means on said valve body and said cover for actuating said cut-off plates and for controlling the rotary movement of said valve body.

6. A cut-off valve comprising a casing; a cylindrical rotary valve body in said casing and having a transverse bore for the passage of the fluid; a pair of diametrically opposite cut-off plates associated with said valve body; a spindle for actuating said valve body; a cover for said casing and in and through which the spindle projects; a plurality of cams in said valve body which are adapted to actuate the cut-off plates; and means on said valve body and said cover for actuating said cams and for controlling the rotary movement of said valve body.

7. A cut-off valve comprising a casing; a cylindrical rotary valve body in said casing and having a transverse bore for the passage of the fluid; a pair of diametrically opposite cut-off plates associated with said valve body; a plurality of cams in said valve body which are adapted to actuate the cut-off plates; and single means for actuating said cams and for rotating said valve body.

8. A cut-off valve comprising a casing; a cylindrical rotary valve body in said casing and having a transverse bore for the passage of the fluid; a pair of diametrically opposite cut-off plates associated with said valve body; a plurality of cams in said valve body which are adapted to actuate the cut-off plates; a spindle for actuating said valve body; and means on said valve body and associated with said spindle for actuating said cams.

9. A cut-off valve comprising a casing; a rotary valve body in said casing; a pair of cut-off plates provided in said valve body; an auxiliary valve in each cut-off plate; and means for rotating said valve body and for actuating said cut-off plates.

10. A cut-off valve comprising a casing; a cylindrical rotary valve body in said casing; a pair of cut-off plates provided in said valve body; an auxiliary valve in each cut-off plate; means for operating said plates and said auxiliary valves; and means for rotating said valve body and for actuating said first-named means.

11. A cut-off valve comprising a casing; a cylindrical rotary valve body in said casing and having a transverse bore for the passage of the fluid; a pair of diametrically opposite cut-off plates associated with said valve body; an auxiliary valve in each cut-off plate; a spindle for rotating said valve body; and means on said valve body and said spindle for actuating said cut-off plates and the auxiliary valves.

12. A cut-off valve comprising a casing; a cylindrical rotary valve body in said casing and having a transverse bore for the passage of the fluid; a pair of diametrically opposite cut-off plates associated with said valve body; a shaft for each plate and rotatably mounted in said valve body; a cam on each shaft which is adapted to actuate the plate; an auxiliary valve in each cut-off plate which is adapted to be actuated by said shaft; and means for actuating said shafts and for rotating said valve body.

13. A cut-off valve comprising a casing; a cylindrical rotary valve body in said casing and having a transverse bore for the passage of the fluid; a pair of diametrically opposite cut-off plates associated with said valve body; a shaft for each plate and rotatably mounted in said valve body; a cam on each shaft which is adapted to actuate the plate; an auxiliary valve in each cut-off plate which is adapted to be actuated by said shaft; a spindle for actuating said valve body; and means on said valve body and associated with said spindle for actuating said shaft.

14. A cut-off valve comprising a casing; a cylindrical rotary valve body in said casing and having a transverse bore for the passage of the fluid; a pair of diametrically opposite cut-off plates associated with said valve body; a shaft for each plate and rotatably mounted in said valve body; a cam on each shaft which is adapted to actuate the plate; an auxiliary valve in each cut-off plate which is adapted to be actuated by said shaft; a spindle for actuating said valve body; a cover for said casing and in and through which the spindle projects; and means on said valve body and said cover for actuating said shafts and for controlling the rotary movement of said valve body.

15. A rotary valve body for a cylindrical cut-off valve comprising a plurality of rollers arranged around the entire periphery of the body and which are adapted to roll against the inside of the casing of the valve in order to reduce the friction and to center the body in the casing.

16. A rotary valve body for a cylindrical cut-off valve comprising a plurality of rollers arranged in recesses in the upper and lower parts of the body and which are adapted to roll against the inside of the casing of the valve in order to reduce the friction and to center the body in the casing.

In testimony whereof I affix my signature.

ARNO BÖTTNER.